United States Patent

Graham II

Patent Number: 5,720,380
Date of Patent: Feb. 24, 1998

[54] REVERSE BUCKLING DISK WITH INCORPORATED KNIFE

[75] Inventor: James R. Graham II, Tulsa, Okla.

[73] Assignee: Oklahoma Safety Equipment Co., Broken Arrow, Okla.

[21] Appl. No.: 565,142

[22] Filed: Dec. 1, 1995

[51] Int. Cl.$^6$ .................................................. F16K 17/40
[52] U.S. Cl. .................................................. 220/89.3
[58] Field of Search .................................. 220/89.2, 89.3

[56] References Cited

U.S. PATENT DOCUMENTS

| | | |
|---|---|---|
| 2,224,748 | 12/1940 | Sauer . |
| 2,661,753 | 12/1953 | Stroop . |
| 2,954,897 | 10/1960 | Hansen et al. . |
| 2,987,218 | 6/1961 | Erickson et al. . |
| 3,698,598 | 10/1972 | Wood et al. . |
| 3,845,878 | 11/1974 | Carlson . |
| 4,072,160 | 2/1978 | Hansen . |
| 4,158,422 | 6/1979 | Witten et al. . |
| 4,463,865 | 8/1984 | Mundt et al. ............ 220/89.3 |
| 4,512,171 | 4/1985 | Mozley . |
| 4,553,559 | 11/1985 | Short, III . |
| 4,580,691 | 4/1986 | Hansen .................... 220/89.3 |
| 4,597,505 | 7/1986 | Mozley . |
| 4,721,224 | 1/1988 | Kawabata . |
| 4,951,697 | 8/1990 | Fritts . |
| 5,005,722 | 4/1991 | Short, III et al. . |
| 5,154,202 | 10/1992 | Hibler, Jr. et al. . |
| 5,267,666 | 12/1993 | Hinrichs et al. . |
| 5,305,775 | 4/1994 | Farwell . |

*Primary Examiner*—Joseph M. Moy
*Attorney, Agent, or Firm*—Jones, Day, Reavis & Pogue

[57] ABSTRACT

A reverse buckling disk has an annular retaining flange for mounting in a flow passageway. The annular retaining flange is integrally formed with a central domed portion having a concave side and a convex side. The disk has a predetermined material thickness and domed height for establishing a rated pressure at which the central domed portion reverse buckles. A metal cutting element or knife is fixedly attached to at least a portion of the convex side of the central domed portion in surface-conforming relationship. The metal cutting element has a thickness greater than the thickness of the disk material and has at least one knife point thereon for cutting the disk as the central domed portion reverse buckles at the rated pressure.

21 Claims, 1 Drawing Sheet

REVERSE BUCKLING DISK WITH INCORPORATED KNIFE

BACKGROUND OF THE INVENTION

1. Field of the Invention

The present invention relates generally to a reverse buckling pressure relief disk for use in a fluid transportation system and in particular to a reverse buckling disk assembly that includes an incorporated knife as part of the disk assembly. In addition, the invention also relates to a double reverse buckling disk assembly.

2. Description of Related Art

Relief devices of the type commonly known as rupture disks have been utilized by the industry for many years to provide a safety mechanism to relieve excess pressure from an overpressurized system or vessel in a reliable manner. Through the years, numerous improvements have been made in the rupture disk in order to reduce the cost and to improve its simplicity and reliability.

One type of disk is known as the reverse buckling rupture disk and is positioned in the system such that a dome formed with the disk is positioned in the vent with its convex side toward the pressure side of the vent. Thus, the convex side of the dome faces the upstream side of the vent wherein pressurized fluid is located. Such disks can be operated at pressures that are very close to the bursting pressure of the disk. The dome collapses when fluid pressure reaches a preselected pressure for which the dome is designed. As the dome is ruptured, it is forced in the direction of the downstream side of the system.

Knife blades have been utilized in an adjacent relationship with reverse buckling rupture disks to puncture the disks upon reversal and bring about the full opening thereof. Scores or grooves have also been utilized in both conventional and reverse buckling rupture disks to create lines of weakness along which the disk ruptures when overpressured.

It is important that the elements of the rupture disk be retained by the remainder of the disk after being ruptured. If any portion of the rupture disk escapes into the fluid system, it can cause damage to valves and other equipment. Thus, it is extremely important that the rupture disk dome and any portions thereof remain intact after rupture and remain attached to the assembly in which they are mounted.

The prior art utilizes several methods of insuring proper rupture while retaining the parts of the rupture disk with the mounting elements. Some use adjacent knives to cut the dome when it is ruptured and form a pattern so as to cause petals that are held to a flange portion of the disk by tabs. Others use grooves, scores or etchings on the dome of the reverse buckling rupture disk. When such a device ruptures, it fractures along the lines of weakness produced by the grooves so as to form petals that are held by flange portions to the remainder of the assembly.

Examples of reverse buckling disk assemblies are found in U.S. Pat. Nos. 4,158,422; 4,072,160; 4,512,171; 4,597,505; and 5,005,722. In addition, a unique reverse buckling disk assembly utilizing an eccentric score line has been disclosed and commonly assigned copending application Ser. No. 08/418,564, filed Apr. 7, 1995 and entitled "Eccentric Scored Rupture Disk Assembly," now U.S. Pat. No. 5,558,114.

It would be advantageous to have a reverse buckling rupture disk assembly that did not require an adjacent knife but that would have a knife incorporated as a part of the assembly itself with connector means to ensure that the severed portion of the dome did not fragment and separate from the assembly to be ingested by the system.

SUMMARY OF THE INVENTION

Thus, the present invention relates to a domed rupture disk assembly with a knife portion rigidly attached to at least part of the dome. The novel domed rupture disk is designed to rupture or buckle with a rated pressure on the convex side of the disk. The rupture or buckling pressure is controlled by the crown height and the material thickness of the dome. When the dome buckles, the knife portion attached to the convex side of the disk or dome slices through the material forming the dome. A retainer ring and a connector between the retainer ring and the knife portion prevents the knife portion from going downstream.

The knife portion itself is a cutting element that is fixedly attached to at least a portion of preferably the convex side of the central dome portion in surface-conforming relationship. The cutting element is sometimes referred to as "metal cutting element" but may be made of any suitable material such as plastic composites. The metal cutting element has a thickness greater than the thickness of the disk material itself and at least one knife point is formed on the metal cutting element for cutting the disk as the central domed portion reverse buckles at the rated pressure.

In one embodiment, the metal cutting element is formed with at least two sides of a spherical triangle with the apex of the two sides forming a knife point. In another embodiment, the cutting element is a spherical polygon surface with a plurality of cutting knife points. The cutting element may be attached to the central domed portion by spot welding. As the dome buckles in the reverse direction under pressure, the knife portion, which is of a thicker material than the disk material, and because it is fixedly attached to the domed surface in surface-conforming relationship, slices through the domed material as it buckles. To prevent the knife portion and the attached disk material from fragmenting and being ingested by the system, a connector is attached between the knife portion and a retaining ring that is mounted in superimposed relationship with the annular retaining flange of the dome-shaped buckling disk. The retainer connector may be integrally formed with and connect the annular retaining ring to the metal cutting element.

In another embodiment, because the ruptured disk material is very thin for low pressure reverse buckling disks, and can be easily damaged during handling, a metal layer is fixedly attached to at least a portion of the concave side of the central domed portion opposite the cutting element in surface-conforming relationship. The metal layer also has a thickness greater than the thickness of the disk material. The metal cutting element and the metal layer are fixedly attached to each other on each side of the central domed portion by spot welding to each other. The metal layer may be a circular spherical surface segment. This provides the domed rupture disk assembly with much greater rigidity for ease of handling and subjects the disk to much less damage during handling and installation.

Where the metal layer is a circular spherical surface segment, the annular retaining ring may be on the concave side of the disk in superimposed relationship with the annular retaining flange and the retainer connector may be integrally formed with and connect the annular retaining ring to the metal layer to prevent the metal layer and attached cutting element from fragmenting and being ingested in the flow passageway.

In another embodiment of the present invention, a low pressure double reverse buckling disk assembly is provided. It has an annular retaining flange for mounting the disk in the flow passageway. A first central domed portion of a first material thickness is integrally formed with the annular flange and has a first base diameter. A second central domed portion is formed in the convex side of the first central domed portion and has a second base diameter smaller than the first base diameter of the first central domed portion. The second central domed portion has a concave side and a convex side, with the concave side extending inwardly into the convex side of the first central domed portion, to form the double reverse buckling disk. A first metal cutting element in the form of an annular ring with at least one knife point is fixedly attached in surface-conforming relationship to the convex side of the first central domed portion surrounding the base of the concave side of the second central domed portion for cutting the material of the disk when the first central domed portion buckles in the reverse direction. A second metal cutting element with at least one knife point is fixedly attached to at least a portion of the convex side of the second central domed portion in surface-conforming relationship for cutting the material forming the second central dome portion when the second central domed portion buckles in the reverse direction. The disk has a rated reverse buckling pressure in the direction of the convex side of the second central domed portion and a buckling pressure of various multiples of the rated reverse buckling pressure in the opposite direction.

If desired, an annular back-up ring may be placed on the concave side of the first central domed portion opposite the annular ring forming the first metal cutting element in surface-conforming relationship. The annular back-up ring and the opposing annular ring first metal cutting element are fixedly attached to each other as by spot welding through the dome material. A metal back-up layer is fixedly attached to the concave side of the second central domed portion opposite the second cutting element in surface-conforming relationship and is fixedly attached to the second cutting element through the second domed portion. Thus, the double reverse buckling disk has a rated buckling pressure in the direction of the convex side of the second dome assembly and a rated buckling pressure of various multiples of that in the opposite direction.

In order to provide greater rigidity to the assembly, the annular back-up ring and the metal layer are provided, as indicated earlier, on the opposite side from the cutting assemblies. To prevent the ruptured portions from fragmenting and being ingested into the system, a first retainer connector may be integrally formed with and connect the annular retaining ring. There is also a second retainer connector fixedly coupled between the annular back-up ring and the second cutting element to prevent the second cutting element from fragmenting and being ingested into the flow passageway when the second central domed portion buckles.

Thus, it is an object of the present invention to provide a reverse buckling disk assembly having a knife portion attached in surface-conforming relationship to the convex side of the dome assembly.

It is also an object of the present invention to provide a connector between a retaining ring and a knife portion formed on the convex side of the domed buckling assembly in surface-conforming relationship such that when the dome reverse buckles and the knife portion cuts through the dome material, the cut portion is held by the connector to the retaining ring.

It is still another object of the present invention to provide a reverse buckling ruptured disk assembly that is easier to handle because of rigidity given to it by placing a knife portion on the convex side of the dome in surface-conforming relationship and a metal layer fixedly attached to at least a portion of the concave side of the central domed portion opposite the knife portion also in surface-conforming relationship. The metal layer and the knife portion are both formed of a metal having a thickness greater than the thickness of the disk material.

It is still another object of the present invention to provide a double reverse buckling disk assembly that has a first central domed portion and a second central domed portion formed in the convex side of the first central domed portion, the second central domed portion extending inwardly into the convex side of the first central domed portion.

It is yet another object of the present invention to provide a double reverse buckling disk assembly having a first metal cutting element in the form of an annular ring fixedly attached in surface-conforming relationship on the convex side of a first central domed portion surrounding the base of the concave side of a second central domed portion that extends inwardly into the convex side of the first central domed portion and having at least one knife point for cutting the dome material thickness when the first central domed portion buckles in the reverse direction. A second metal cutting element having at least one knife point is fixedly attached to at least a portion of the convex side of the second central domed portion in surface-conforming relationship for cutting the second central dome when the second central domed portion buckles in the reverse direction.

It is still another object of the present invention to provide improved handling capability of the low pressure double reverse buckling disk assembly by providing an annular back-up ring on the concave side of the first central domed portion opposite the annular ring forming the first metal cutting element in surface-conforming relationship and being fixedly attached to each other through the domed portion. A metal layer may also be fixedly attached to the concave side of the second central domed portion opposite the second cutting element in surface-conforming relationship and also may be fixedly attached to each other.

It is also an object of the present invention to provide a low-pressure double reverse buckling disk assembly having a first retainer connector integrally formed with and connecting an annular retaining ring to an annular back-up ring to prevent the annular back-up ring and its attached annular ring first metal cutting element from fragmenting and being ingested into the flow passageway when the first central domed portion buckles. A second retainer connector is fixedly coupled between the annular back-up ring and the second cutting element to prevent the second cutting element from fragmenting and being injected into the flow passageway when the second central domed portion buckles in the reverse direction.

Thus the present invention relates to an improved reverse buckling disk having an annular retaining flange for mounting in a flow passageway, the annular retaining flange being integrally formed with a central domed portion having a concave side and a convex side, the disk having a predetermined material thickness and domed height for establishing a rated pressure at which the central domed portion reverse buckles, the improvement including a metal cutting element fixedly attached to at least a portion of one side of the central domed portion in surface-conforming relationship, the metal cutting element having a thickness greater than the thickness of the disk material, and at least one knife point on the metal cutting element for cutting the disk as the central domed portion reverse buckles at the rated pressure.

The invention also relates to a double reverse buckling disk assembly comprising an annular retaining flange for mounting the disk in a flow passageway, a first central domed portion of a first material thickness integrally formed with the annular flange and having a first base diameter, a second central domed portion formed in the convex side of the first central domed portion and having a second base diameter smaller than the first base diameter of the first central domed portion, the second central domed portion having a convex side and a concave side; and the concave side of the second central domed portion extending inwardly into the convex side of the first central domed portion to form a double reverse buckling disk assembly.

BRIEF DESCRIPTION OF THE DRAWINGS

These and other features of the present invention will be more fully disclosed when taken in conjunction with the following DETAILED DESCRIPTION OF THE INVENTION in which like numerals represent like elements and in which.

DETAILED DESCRIPTION OF THE INVENTION

Figure 1:
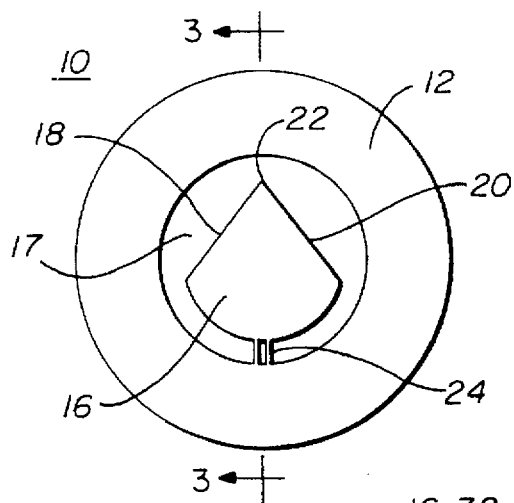
FIG. 1 is a plan view of a novel reverse buckling disk assembly having a knife portion thereon in surface-conforming relationship and that has at least two sides of a spherical triangle with the apex of the two sides forming a knife point.
Figure 3:
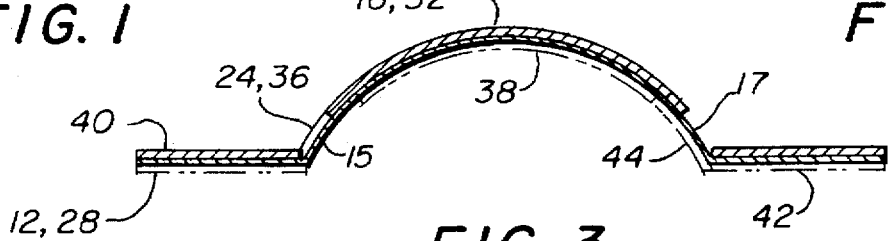
FIG. 3 is a cross-sectional view taken along lines 3—3 of either FIGS. 1 or 2.

FIG. 1 is a plan view of the novel reverse buckling disk assembly of the present invention. The disk 10 has an annular retaining flange 12 for mounting in a flow passageway. The annular retaining flange 12 is integrally formed with a central domed portion 14 having a concave side 15 and a convex side 17 (see FIG. 3). The disk 10 has a predetermined material thickness and domed height for establishing a rated pressure at which the central domed portion 14 reverse buckles. A metal cutting element or knife portion 16 is fixedly attached to at least a portion of one side of the central domed portion 14 and, as shown in FIG. 3, is in surface-conforming relationship on the convex side 17. The metal cutting element or knife portion 16 has a thickness greater than the thickness of the disk material. The metal cutting element 16 also has a knife point 12 formed by two sides 18 and 20 of a spherical triangle with the apex of the two sides forming a knife point 22. The knife point 22 cuts the disk as the central domed portion 14 reverse buckles at the rated pressure. The metal cutting element 16 may be attached to the domed surface 14 in surface-conforming relationship in any well-known manner such as, for instance, by spot welding. Because it is desirable that the metal cutting element 16 and its associated cut disk material not be fragmented and ingested in the flow passageway, a retainer connector 24 is integrally formed with and connects with an annular retainer ring 40, shown in FIG. 3, and to the metal cutting element 16, thereby preventing the cutting element from fragmenting.

It should be understood that the cross-sectional view of the novel reverse buckling disk 10 of FIG. 1 as shown in FIG. 3 is not drawn to scale. Again, it is emphasized that the thickness of the metal cutting element 16 is greater than the thickness of the central domed portion 14 and the annular retaining flange 12. In like manner, the annular retainer ring 40, shown in FIG. 3, is made of material that is of greater thickness than the thickness of the disk material.

Figure 2:
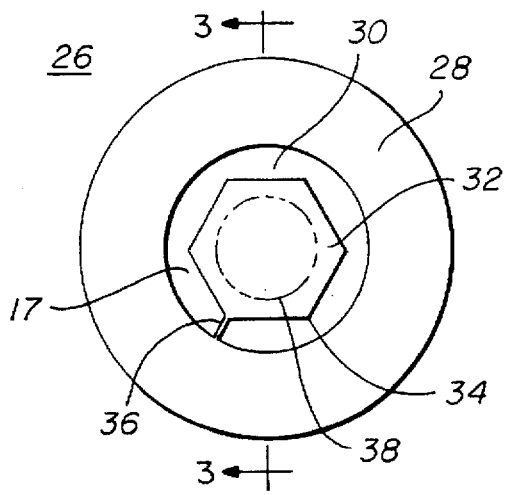
FIG. 2 is a plan view of a reverse buckling disk assembly having on the convex side of the dome thereof a knife portion having the shape of a spherical polygon surface with a plurality of cutting knife points.

In the embodiment illustrated in FIG. 2, the disk 26 again has an annular retaining flange 28 and a central domed portion 30 with a metal cutting element or knife portion 32 fixedly attached to the convex side of the central domed portion 30 in surface-conforming relationship and is in the form of a spherical polygon surface with a plurality of cutting knife points 34. Again, to prevent fragmenting of the metal cutting element 32 and the attached central domed portion when the disk reverse buckles and is cut by the cutting element 32, a retainer connector 36 is again integrally formed with and connects the annular retaining ring 40 to the metal cutting element 32. It is clear that the retainer connector 36 may be formed of at least one elongated metallic strand. As shown in FIG. 1 and FIG. 2 the retainer connector 24, 36 may be at least one elongated S-shaped metallic strand or may include a plurality of parallel metallic strands. In larger reverse buckling disk assemblies, if necessary, the strands 24, 36 may be formed of two spaced groups, including group 24' and 36'.

To form an even more sturdy reverse buckling disk, a metal layer 38 (shown in phantom lines in FIG. 2) is fixedly attached to at least a portion of the concave side of the central domed portion 30 opposite the cutting element or knife portion 32 in surface-conforming relationship. Again, the metal layer 38 has a thickness greater than the disk material thickness. The knife portion 32 and the metal layer 38 may be spot welded together in their positions on each side of the domed portion 30.

As shown in FIG. 3 in phantom lines, if desired, the cutting element 32 may be placed on the concave side of the central domed portion of the disk (where the metal layer 38 is shown in phantom lines) with a retainer ring 42 also being on the bottom of the retaining flange of the disk assembly and being connected by a retainer connector 44 to the cutting element in a similar manner to that already shown.

Figure 4:
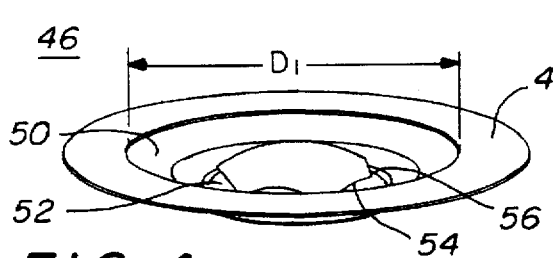
FIG. 4 is an isometric top view of the novel double reverse buckling disk assembly.
Figure 5:
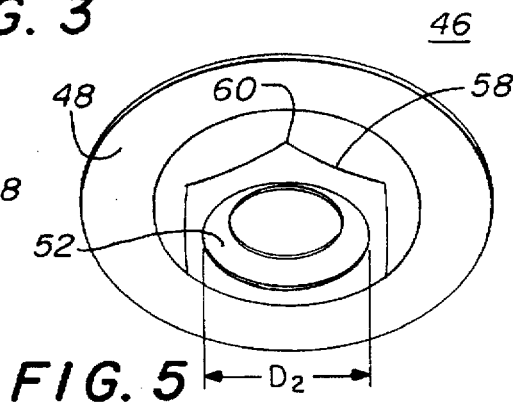
FIG. 5 is an isometric bottom view of the novel double reverse buckling disk assembly shown in FIG. 4.

FIG. 4, 5, 6 and 7 are respectively, an isometric top view, an isometric bottom view, a plan view, and a cross-sectional view of a novel double reverse buckling disk assembly 46. The double reverse buckling disk 46 as shown comprises an annular retaining flange 48 for mounting the disk in a flow passageway. A first central domed portion 50 of a first material thickness is integrally formed with the annular flange 48 and has a first base diameter D1. A second central domed portion 52 is formed in the convex side of the first central domed portion 50 and has a second base diameter, D2, as shown in FIG. 5, that is smaller than the first base diameter D1 of the first central domed portion 50. The second central domed portion 52 has a convex side shown in FIG. 4 and a concave side shown in FIG. 5. The concave side of the second central domed portion 52, as shown in FIG. 5, extends inwardly into the convex side of the first central domed portion 50, as shown in both FIG. 4 and FIG. 5, to form a double reverse buckling disk.

So that the double reverse buckling disk will have its own cutting knife and will cut when buckling in either direction, a first metal cutting element 58 in the form of an annular ring having at least one knife portion 60 is in surface-conforming relationship on the convex side of the first central dome surrounding the base diameter D2 of the concave side of the second central domed portion 52 for cutting the disk material thickness when the first central domed portion 50 buckles in the reverse direction as shown in FIG. 5.

As shown in FIG. 4, there is a second metal cutting element 54 fixedly attached to at least a portion of the convex side of the second central domed portion 52 in surface-conforming relationship for cutting the second central domed 52 when the second central domed portion buckles in the reverse direction. The second cutting element 54 also has at least one knife point 56 for cutting the second central domed portion 52 when the buckling occurs. The disk shown in FIG. 4 and 5 has a rated reverse buckling pressure in the direction of the convex side of the second central domed portion 52 and a buckling pressure of various multiples of the rated reverse buckling pressure in the opposite direction.

Figure 6:
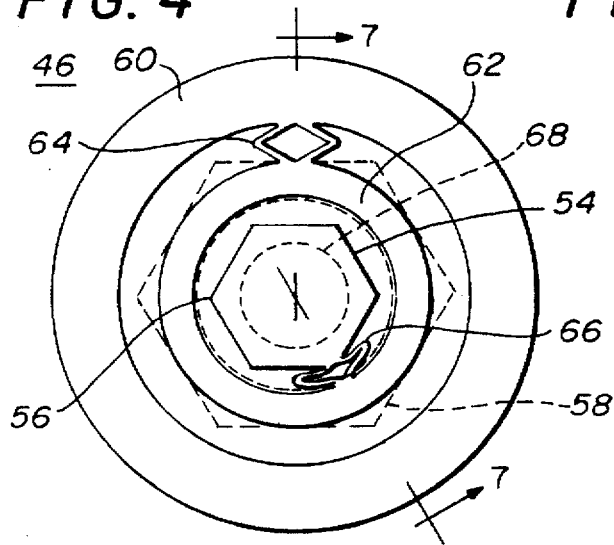
FIG. 6 is a top plan view of the novel double reverse buckling disk assembly.
Figure 7:
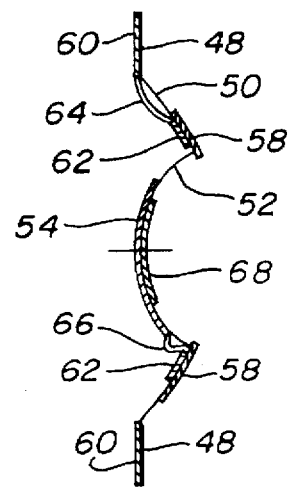
FIG. 7 is a cross-sectional view of the novel double reverse buckling disk assembly shown in FIG. 6.

In order to cause greater stability of the device so that it can be handled easily and installed without damage, an annular back-up ring 62 is placed on the concave side of the first central domed portion 50 opposite the annular ring 58 forming the first metal cutting element in surface-conforming relationship as best shown in FIGS. 6 and 7. The back-up ring 62 is attached to the first metal cutting element 58 in any well-known manner such as by spot welding. Thus, the annular back-up ring 62 and the opposing annular ring first metal cutting element 58 are fixedly attached to each other. This can be clearly seen in cross-sectional view in FIG. 7.

Also as can be seen in FIG. 7, a metal layer 68 is fixedly attached to the concave side of the second central domed portion 52 opposite the second cutting element 54 in surface-conforming relationship. The metal layer 68 and the opposing second cutting element 54 are also fixedly attached to each other by any well known means such as spot welding as described previously. The metal layer 58 may have any desired shape such as, for instance, a circular spherical surface segment.

Thus, the unit has rigidity with the annular back-up ring and the metal layer being attached to the cutting elements on the opposite sides. In order to prevent fragmenting and having parts of the disk being ingested into the flow passageway, an annular retainer ring 60 (see FIG. 7) is mounted in superimposed relationship with the annular retaining disk flange 48. A first retainer connector 64 is integrally formed with and connects the annular retaining ring 60 to the annular back-up ring 62 to prevent the annular back-up ring and its attached annular ring first metal cutting element 58 from fragmenting and being ingested into the flow passageway when the first central domed portion 50 buckles. In addition, a second retainer connector 66 is fixedly coupled between the annular back-up ring 62 and the second cutting element 54 to prevent the second cutting element 54 from fragmenting and being ingested into the flow passageway when the second central domed portion 52 buckles.

Thus as stated, the novel disk shown in FIGS. 4, 5, 6, and 7 has a rated reverse buckling pressure in the direction of the convex side of the second central domed portion 52 and a buckling pressure of 1½× at rated reverse buckling pressure in the opposite direction.

Thus, there has been disclosed a novel reverse buckling disk that carries its own knife portion or element in surface-conforming relationship on the central domed portion in a rigidly attached relationship such that when the dome reverse buckles, the knife, having at least one cutting point thereon, cuts through the domed material at the rated pressure.

Also, the novel disk of the present invention has a metal layer fixedly attached to at least a portion of the concave side of the central domed portion opposite the cutting element in surface-conforming relationship, both the cutting element and the metal layer having a thickness greater than the thickness of the disk material and being fixedly attached to each other, such as by spot welding, to form a disk that is even more rigid and much easier to handle without damage to the disk during handling and installation.

In addition, the present invention includes an annular retainer ring for mounting in superimposed relationship with the disk annular retainer flange and a retainer connector integrally formed with and connecting the annular retaining ring to the metal cutting element to prevent the cutting element from fragmenting and being ingested in the flow passageway.

Further, the novel invention includes a double reverse buckling disk that has a first central domed portion of a first material thickness integrally formed with an annular flange and having a first based diameter. A second central domed portion is formed in the convex side of the first central domed portion and has a second base diameter smaller than the first base diameter of the first central domed portion. The concave side of the second central domed portion extends inwardly into the convex side of the first central domed portion to form the double reverse buckling disk.

Cutting knives are incorporated on the surface of each of the first and second central domed shapes for cutting the disk material when the disk buckles in either direction.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

I claim:

1. In a reverse buckling disk assembly having an annular retaining flange for mounting in a flow passageway, said annular retaining flange being integrally formed with a central domed portion having a concave side and a convex side, said disk having a predetermined material thickness and domed height for establishing a rated pressure at which the central domed portion reverse buckles, the improvement including:

a metal cutting element fixedly attached to at least a portion of one side of said central domed portion in surface-conforming relationship;

said metal cutting element having a thickness greater than the thickness of said disk material; and at least one knife point on said metal cutting element for cutting said disk as said central domed portion reverse buckles at said rated pressure.

2. The improvement of claim 1 wherein said cutting element is fixedly attached to said convex side of said central domed portion of said disk.

3. The improvement of claim 2 wherein said cutting element includes at least two sides of a spherical triangle with the apex of the two sides forming said one knife point.

4. The improvement of claim 2 wherein said cutting element is a spherical polygon surface with a plurality of said cutting knife points.

5. The improvement of claim 1 wherein said cutting element is preferably attached to said central domed portion by spot welding.

6. The improvement of claim 1 further including:

an annular retainer ring for mounting in superimposed relationship with said annular retaining flange; and a retainer connector integrally formed with and connecting said annular retaining ring to said metal cutting element to prevent said cutting element from fragmenting and being ingested in said flow passageway.

7. The improvement as in claim 6 wherein said retainer connector is formed of at least one elongated metallic strand.

8. The improvement as in claim 7 wherein said at least one elongated metallic strand is S-shaped.

9. The improvement as in claim 7 wherein said at least one metallic strand includes a plurality of parallel metallic strands.

10. The improvement as in claim 9 wherein said plurality of metallic strands are all S-shaped.

11. The improvement as in claim 9 wherein said plurality of parallel metallic strands includes at least two spaced groups of parallel metallic strands.

12. The improvement as in claim 1 wherein said cutting element is fixedly attached to the concave side of said central dome shaped portion of said disk.

13. The improvement of claim 1 further including:

a metal layer fixedly attached to at least a portion of the concave side of the central domed portion opposite said cutting element in surface-conforming relationship; and said metal layer having a thickness greater than the thickness of said disk material.

14. The improvement as in claim 13 wherein said metal cutting element and said metal layer are fixedly attached to each side of said central domed portion by spot welding to each other.

15. The improvement as in claim 13 wherein said metal layer is a circular spherical surface segment.

16. The improvement as in claim 13 further including:

an annular retaining ring for mounting in superimposed relationship with said annular retaining flange; and a retainer connector integrally formed with and connecting said annular retaining ring to said metal layer to prevent said metal layer from fragmenting and being ingested in said flow passageway.

17. A double reverse buckling disk including:

an annular retaining flange for mounting said disk in a flow passageway;

a first central domed portion of a first material thickness integrally formed with said annular flange and having a first base diameter;

a second central domed portion formed in the convex side of the first central domed portion and having a second base diameter smaller than the first base diameter of the first central domed portion, the second central domed portion having a concave side and a convex side; and the concave side of said second central domed portion extending inwardly into the convex side of the first central domed portion to form a double reverse buckling disk.

18. A double reverse buckling disk as in claim 17 further including:

a first metal cutting element in the form of an annular ring having at least one knife point fixedly attached in surface-conforming relationship on the convex side of the first central domed portion surrounding the base of the concave side of the second central domed portion, said at least one knife point cutting said material thickness when said first central domed portion buckles in the reverse direction;

a second metal cutting element fixedly attached to at least a portion of the convex side of said second central domed portion in surface-conforming relationship and having at least one knife point for cutting said second central dome when said second central domed portion buckles in a reverse direction; and said disk having a rated reverse buckling pressure in the direction of the convex side of the second central domed portion and a buckling pressure in the opposite direction of various multiples of the rated reverse buckling pressure.

19. A double reverse buckling disk as in claim 18 further including:

an annular back-up ring on the concave side of said first central domed portion in surface-conforming relationship opposite said annular ring forming said first metal cutting element;

said annular back-up ring and said opposing annular ring first metal cutting element being fixedly attached to each other;

a metal layer fixedly attached to the concave side of said second central domed portion in surface-conforming relationship opposite said second cutting element; and said metal layer and said opposing second cutting element being fixedly attached to each other.

20. A double reverse buckling disk as in claim 19 further including:

an annular retainer ring for mounting in superimposed relationship with said annular retaining flange; and a first retainer connector integrally formed with and connecting said annular retaining ring to said annular back-up ring to prevent said annular back-up ring and its attached annular ring first metal cutting element from fragmenting and being ingested into said flow passageway when said first central domed portion buckles.

21. A double reverse buckling disk as in claim 20 further including:

a second retainer connector fixedly coupled between said annular back-up ring and said second cutting element to prevent said second cutting element from fragmenting and being ingested into the said flow passageway when said second central domed portion buckles.

* * * * *